UNITED STATES PATENT OFFICE.

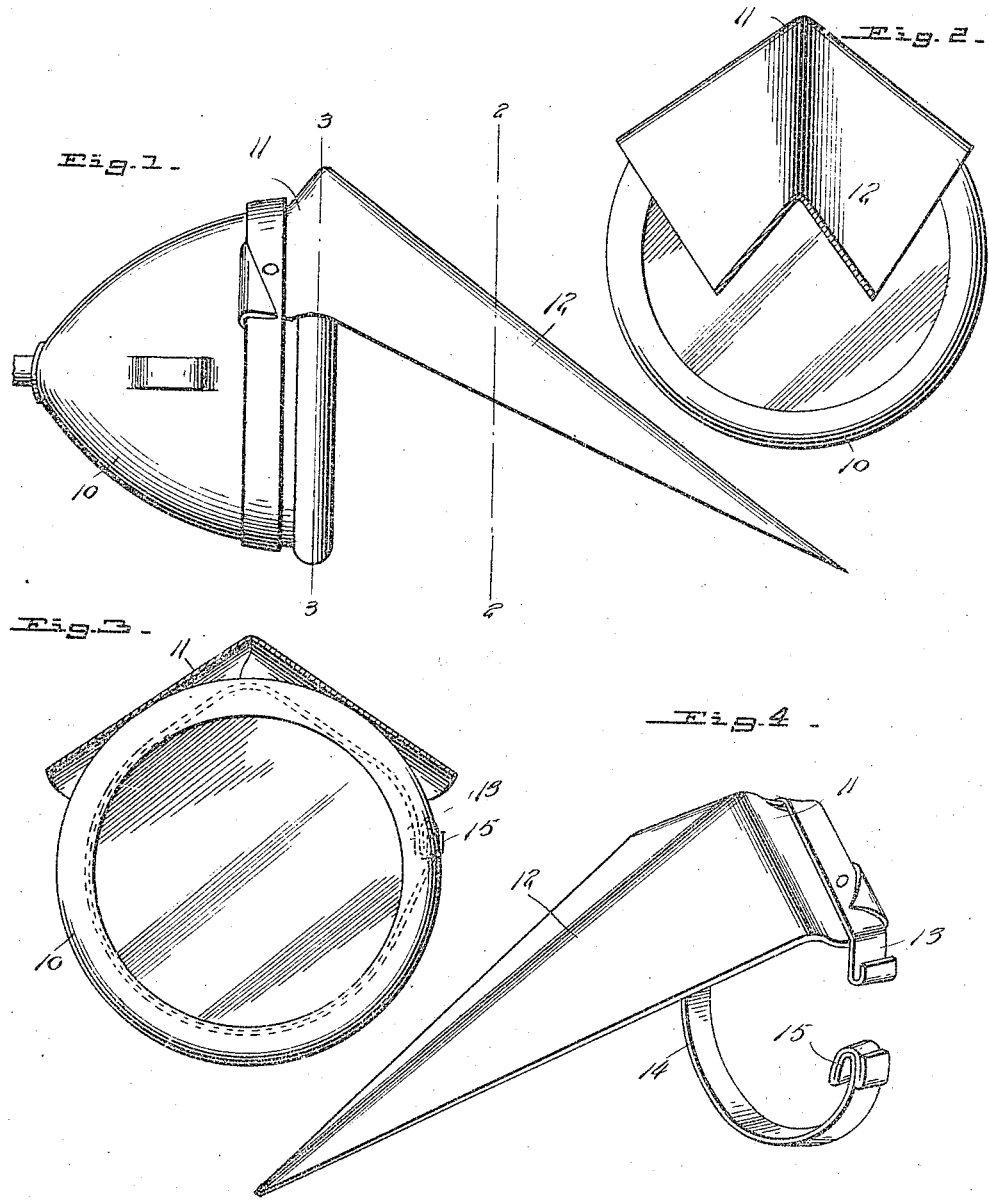

JOHN S. WILLIAMS, OF MILTON, WASHINGTON.

ATTACHMENT FOR VEHICLE-LIGHTS.

1,121,882.

Specification of Letters Patent.  Patented Dec. 22, 1914.

Application filed April 1, 1914. Serial No. 828,802.

*To all whom it may concern:*

Be it known that I, JOHN S. WILLIAMS, a citizen of the United States, residing at Milton, in the county of Pierce, State of Washington, have invented certain new and useful Improvements in Attachments for Vehicle-Lights; and I do hereby declare the following to be a full, clear, and exact description of the invention, such as will enable others skilled in the art to which it appertains to make and use the same.

This invention relates to attachments for vehicle lights.

The object of the invention resides in the provision of an attachment for vehicle lights which can be readily associated with the latter and when so associated will intercept the straight beam of light thrown from the reflector and direct the rays downwardly upon the ground, the attachment serving to avoid "blinding" of the driver of a vehicle moving in the opposite direction to the vehicle having its light provided with the improved attachment.

A further object of the invention resides in the provision of an attachment of the character named which will be simple in construction, efficient in use, and which can be manufactured at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of an automobile lamp having the improved attachments associated therewith; Fig. 2, a section on the line 2—2 of Fig. 1; Fig. 3, a section on the line 3—3 of Fig. 1 with the automobile lamp in elevation, and Fig. 4, a perspective view of the attachment removed from the lamp.

Referring to the drawings 10 indicates an automobile lamp of the usual and well known construction. The improved attachment is shown as comprising a vizor which includes a base portion 11 and a canopy portion 12. The canopy portion 12 is disposed at an angle to the base portion 11 and tapers from the base portion outwardly to a point. In cross section the canopy portion 12 is V-shaped while the base portion 11 follows substantially the contour of the side wall of the lamp 10. One side of the base portion 11 is provided with a hook element 13, while the other side of said base portion has secured thereto one end of a strap 14 and the free end of this strap terminates in a hook element 15.

In applying the attachment to the lamp 10 the base portion 11 is disposed upon the side wall of the lamp at the front end thereof and the strap 14 is then carried around the lamp when the hook element 15 is engaged with the hook element 13. In this manner the attachment is secured to the lamp with the canopy portion 12 extending downwardly so as to intercept the straight beam of light and reflect the rays downwardly upon the ground.

What is claimed is:—

An attachment for a vehicle light comprising a vizor including a base portion and a canopy portion tapering from the base portion to a point, said canopy portion being disposed at an angle to the base portion and having a V-shaped cross section, a hook element carried at one side of the base portion, and a strap having one end secured to the other side of the base portion and its free end provided with a hook element adapted to engage with the first named hook element to secure the attachment to a lamp.

In testimony whereof, I affix my signature, in the presence of two witnesses.

JOHN S. WILLIAMS.

Witnesses:
J. H. McKENZIE,
MARIA A. WILLIAMS.